US009582857B1

(12) United States Patent
Kolesinski (10) Patent No.: US 9,582,857 B1
(45) Date of Patent: Feb. 28, 2017

(54) TERRAIN RELIEF SHADING ENHANCING SYSTEM, DEVICE, AND METHOD

(71) Applicant: Rockwell Collins, Inc., Cedar Rapids, IA (US)

(72) Inventor: Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 52 days.

(21) Appl. No.: 14/755,502

(22) Filed: Jun. 30, 2015

(51) Int. Cl.
G06K 9/40 (2006.01)
G06T 5/00 (2006.01)
G06K 9/00 (2006.01)
G06K 9/46 (2006.01)
G06K 9/52 (2006.01)

(52) U.S. Cl.
CPC ............ G06T 5/00 (2013.01); G06K 9/00476 (2013.01); G06K 9/4652 (2013.01); G06K 9/4661 (2013.01); G06K 9/52 (2013.01)

(58) Field of Classification Search
CPC .. G06T 5/001; G06T 5/40; G06T 5/50; G06T 5/20; H04N 5/20
See application file for complete search history.

(56) References Cited

U.S. PATENT DOCUMENTS

| | | | | |
|---|---|---|---|---|
| 3,743,415 A | * | 7/1973 | Gilman | G03B 15/00 355/103 |
| 3,911,597 A | * | 10/1975 | Millard | B64D 45/00 348/123 |
| 5,283,858 A | * | 2/1994 | Moellering | G06T 15/506 345/426 |
| 6,600,489 B2 | * | 7/2003 | Cook | G06T 15/50 345/420 |
| 7,555,372 B2 | * | 6/2009 | Dwyer | G01C 23/005 340/969 |
| 8,264,498 B1 | * | 9/2012 | VanDerKamp | G01C 21/005 340/980 |
| 8,384,730 B1 | | 2/2013 | VanDerKamp et al. | |
| 8,768,104 B2 | * | 7/2014 | Moses | G06F 9/5072 382/100 |
| 2006/0241821 A1 | * | 10/2006 | Hrabak | G01C 23/00 701/3 |
| 2007/0005199 A1 | * | 1/2007 | He | G01C 23/00 701/16 |
| 2007/0171094 A1 | * | 7/2007 | Alter | G01C 23/00 340/970 |

(Continued)

*Primary Examiner* — Amir Alavi
(74) *Attorney, Agent, or Firm* — Daniel M. Barbieri; Donna P. Suchy; Angel N. Gerdzhikov (57) ABSTRACT

A system, device, and method for minimizing terrain content in an image are disclosed. The terrain content minimization system may include a source of navigation data, a source of first surface data, and an image generator (IG). The IG may be configured to acquire navigation data; acquire first surface data; identify first surface data as a function of an elevation range; generate first pixel data; generate second pixel; and employ at least one of the first pixel data and the second pixel data. Second surface data could be comprised of a first subset of the surface data, and the third surface data could be comprised of a second subset of the surface data not included in the second subset of the first surface data. In addition, the pixel data could be representative of an image of terrain of the surface data.

20 Claims, 5 Drawing Sheets

(56) References Cited

U.S. PATENT DOCUMENTS

2007/0190502 A1* 8/2007 Chladny .............. G09B 29/102
                                                   434/150
2009/0248297 A1* 10/2009 Feyersisen ............. G01C 21/00
                                                    701/467

* cited by examiner

0% Pixel Intensity

FIG. 3A

30% Pixel Intensity

FIG. 3B

60% Pixel Intensity

FIG. 3C

100% Pixel Intensity

TERRAIN RELIEF SHADING ENHANCING SYSTEM, DEVICE, AND METHOD

BACKGROUND

Description of the Related Art

An image of a topological map is presentable to the pilot of an aircraft. When the elevations of the terrain shown in the topological map are relatively close to the altitude of the aircraft, situational awareness may be enhanced because the image displays a snapshot of the terrain that is currently being overflown or will be overflown.

Colors could enhance the image. In some cases, the same color coding scheme employed in navigation map hardcopies may be employed in the image regardless of aircraft altitude, providing the pilot with the same information across dissimilar conveyance mediums. A coloring scheme could depend on a range of terrain elevations that are relative to the aircraft altitude. For example, terrain that is level with the aircraft or higher could be shown in red, and terrain that is below the aircraft 500 feet or less could be shown as yellow or amber; for all other terrain elevations, colors could be omitted, leaving the pilot with the color of black.

When the terrain is presented in colors, contours of the terrain (i.e., lines of equal elevations) may be presented, and shading effects could be added to provide the pilot with a sense of the terrain topology produced using a hypothetical light source. For the areas of the image that are black, however, the pilot's sense of the terrain topology may be lost.

SUMMARY

Embodiments of the inventive concepts disclosed herein are directed to a system, device, and method for enhancing relief shading of an image of terrain. For those images presenting terrain regardless of aircraft altitude (absolute altitude), the content of the image could be minimized but still leave the pilot with an intuitive sense of terrain relief that is below the aircraft. For those images limiting the display of terrain to a range of aircraft altitudes (i.e., absolute altitudes), the content of the image could be added to leave the pilot with an intuitive sense of terrain relief information.

In one aspect, embodiments of the inventive concepts disclosed herein are directed to a system for minimizing the content in an image of terrain. The terrain image content minimization system may include a source of navigation data, a source of first surface data, an image generator (IG), and a display system.

In a further aspect, embodiments of the inventive concepts disclosed herein are directed to a device for minimizing the content in an image of terrain. The device may include the IG and may be configured (or programmed) to perform a method of minimizing the content in an image of terrain.

In a further aspect, embodiments of the inventive concepts disclosed herein are directed to a method for minimizing the content in an image of terrain. When properly configured, the IG may acquire navigation data, divide the first surface data into second surface data and third surface data; generate first pixel data and second pixel data; generate third pixel data from the first pixel data and the second pixel data, and present an image represented in the third pixel data. In some embodiments, the second surface data could be include a first subset of the first surface data, and the third surface data could include a second subset of the first surface data other than the first subset. The first pixel data could be generated from second surface data subjected to at least an application of a coloring function, the second pixel data could be generated from third surface data subjected to at least an application of a shading function, and the third pixel data could be representative of an image of terrain of the plurality of elevations represented in the first surface data.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
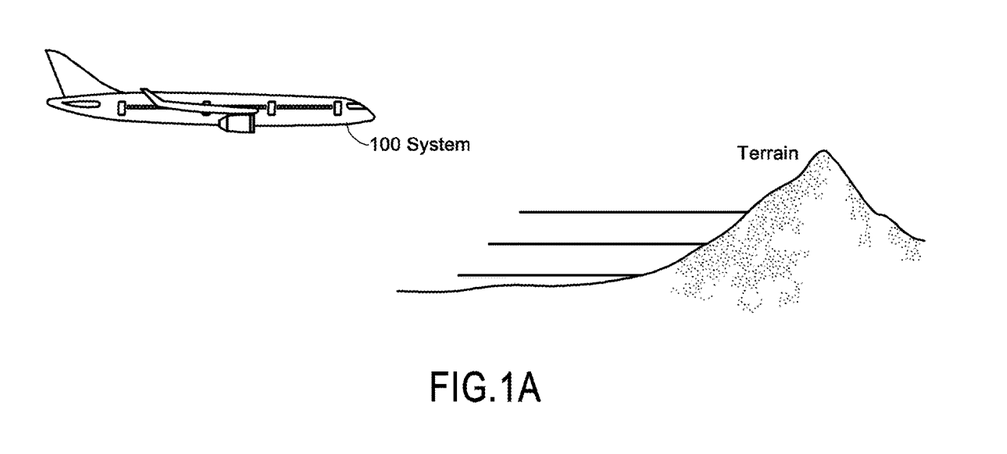
FIG. 1A depicts an aircraft configured with a terrain relief shading enhancing system according to the inventive concepts disclosed herein.
Figure 1B:
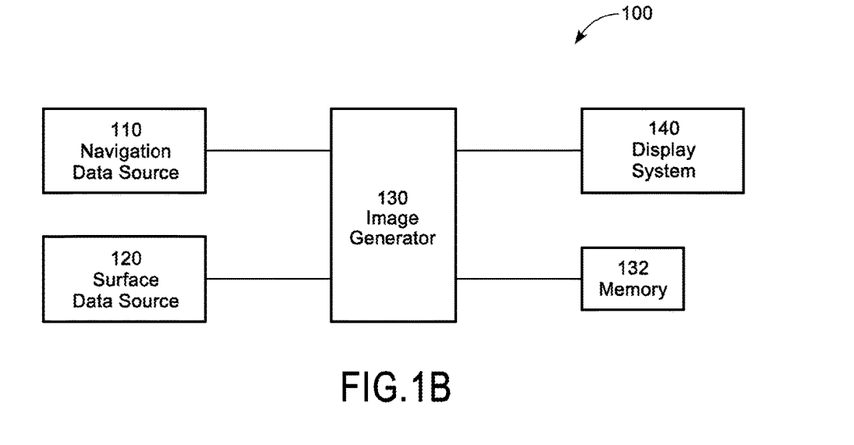
FIG. 1B depicts a functional block diagram of an exemplary embodiment of a terrain relief shading enhancing system according to the inventive concepts disclosed herein.

FIG. 1A depicts an aircraft configured with a terrain relief shading enhancing system 100 suitable for implementation of the techniques described herein. FIG. 1B depicts a functional block diagram of a terrain relief shading enhancing system 100 suitable for implementation of the techniques described herein. The system 100 may include a navigation data source 110, a surface data source 120, an image generator ("IG") 130, and a display system 140.

The navigation data source 110 could include any source (s) which provides navigation data information in an aircraft. The navigation data source 110 may include, but is not limited to, an air/data system, an attitude heading reference system, an inertial guidance system (or inertial reference system), and a global navigation satellite system (or satellite navigation system). The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both.

The surface data source 120 could include one or more sources of surface data that includes terrain data and/or surface feature data of widespread areas. The surface data source 120 could be a terrain database configured to store terrain data contained in digital elevation models ("DEM"). Generally, the terrain data of a DEM are stored as grids, and each grid represents an area of terrain and is commonly referred to as a terrain cell. The surface data source 120 could be a database configured to store data representative of a plurality of elevations of surface features such as, but not limited to, obstacles, buildings, lakes and rivers, and paved or unpaved surfaces. For the purposes of illustration and not of limitation, the surface data source 120 could be comprised of a terrain database employed by a terrain awareness and warning system ("TAWS") such as a TAWS that meets the standards published by the United States Federal Aviation Administration ("FAA") in a Technical Standard Order ("TSO") identified as TSO-151c.

It should be noted that data the surface data source 120 could include any digital memory storage device or IG-readable media (i.e., media readable by the IG 130) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Data included in the surface data source 120 could be loaded while an aircraft is on the ground or in flight and provided manually or automatically through an aircraft system capable of receiving and/or providing such manual or automated data. The surface data source 120 employed herein may be a stand-alone database or a combination of databases.

The IG 130 could include any electronic data processing unit which executes software or computer instruction code that could be stored, permanently or temporarily, in a digital memory storage device or a non-transitory computer-readable media (generally, memory 132) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The IG 130 may be driven by the execution of software or computer instruction code containing algorithms developed for the specific functions embodied herein. The IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 130 could also consist of more than one electronic data processing units. In some embodiments, the IG 130 could be a processor(s) used by or in conjunction with any other system of the aircraft including, but not limited to, the navigation data source 110, the surface data source 120, and the display system 140.

In some embodiments, the terms "programmed" and "configured" are synonymous. The IG 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a 130 bus, through a wireless network, or as a signal received and/or transmitted by the IG 130 via a physical or a virtual computer port. The IG 130 may be programmed or configured to execute the method discussed in detail below. The IG 130 may be programmed or configured to provide output data to various systems and/or units including, but not limited to, the display system 140.

The display system 140 may include one or more display units configured to present information visually to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices). The display system 140 may be configured to present one or more display(s) or image(s). In some embodiments, the terms "display" and "image" are interchangeable and treated synonymously.

Figure 2:
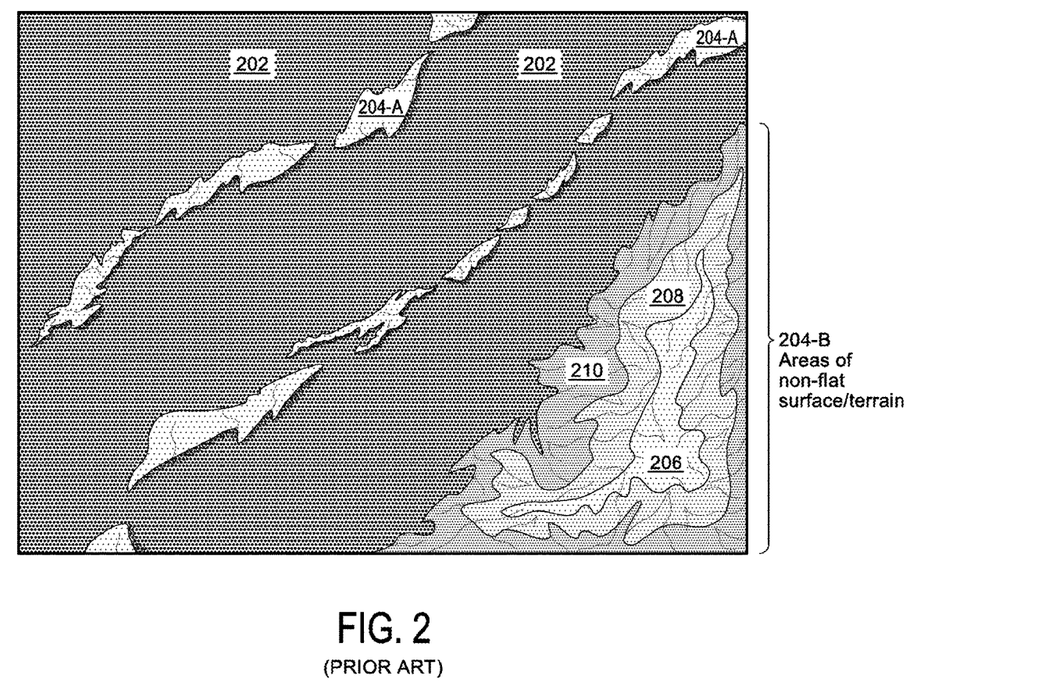
FIG. 2 depicts an image of terrain generated from the use of a shading function according to an exemplary embodiment of the inventive concepts disclosed herein.
Figure 3A:
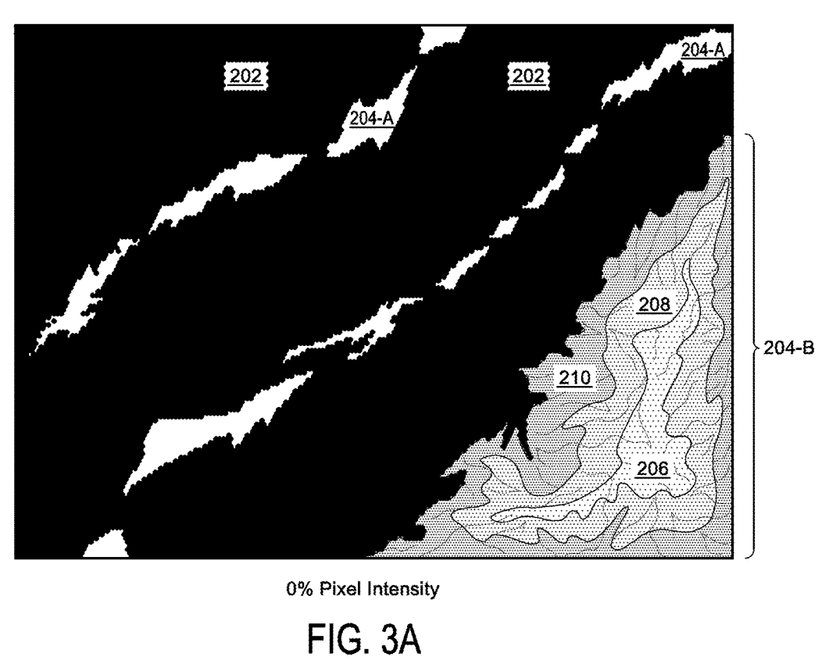
FIG. 3A depicts a modified image of FIG. 2 where a pixel intensity factor has been set to zero percent.
Figure 3B:
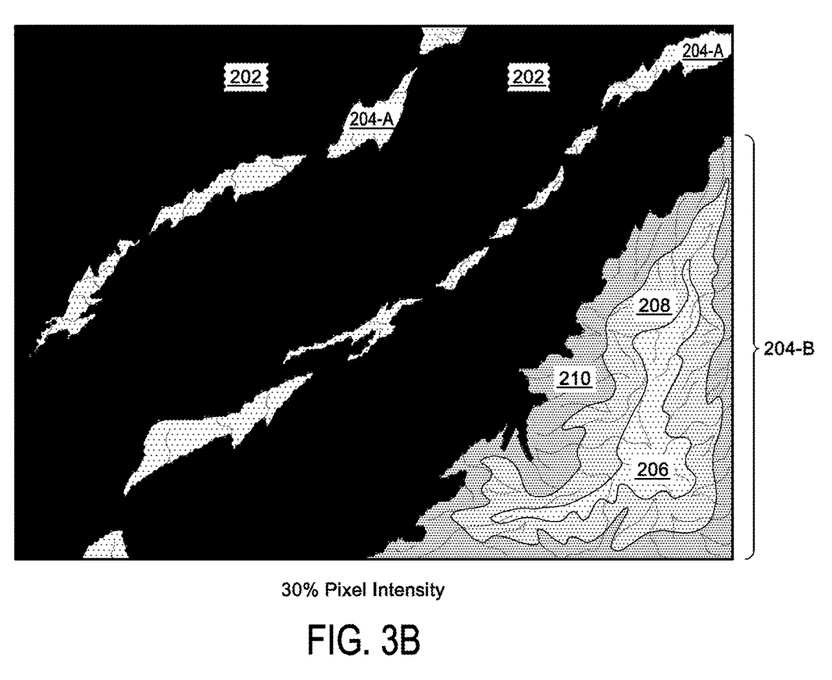
FIG. 3B depicts a modified image of FIG. 2 where a pixel intensity factor has been set to thirty percent.
Figure 3C:
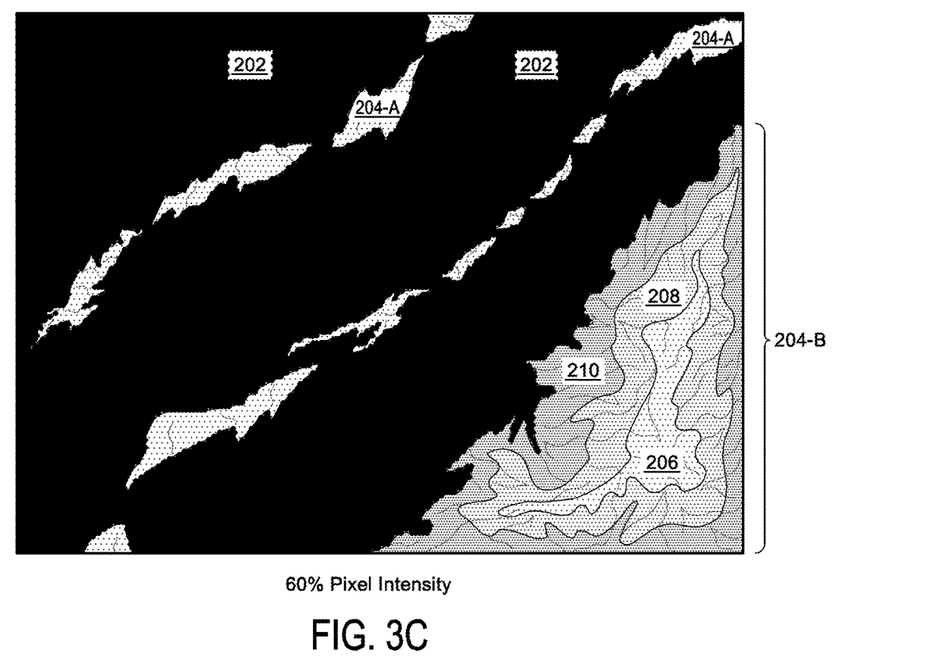
FIG. 3C depicts a modified image of FIG. 2 where a pixel intensity factor has been set to sixty percent.
Figure 3D:
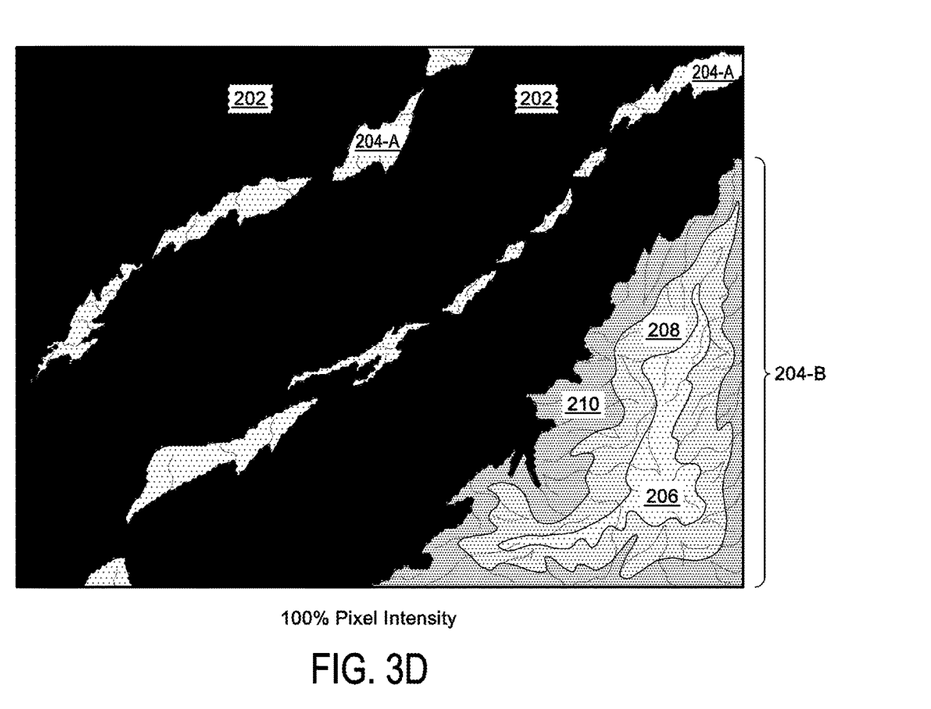
FIG. 3D depicts a modified image of FIG. 2 where a pixel intensity factor has been set to one-hundred percent.

The drawings of FIGS. 2 through 3D depict exemplary illustrations of images of scenes outside the aircraft that could be generated by the IG 130, provided to the display system 130, and presented one or more display units such as, for example, a ND. As shown in these images, the terrain is uneven and could indicate of the use of a plurality of terrain elevations of a plurality of terrain cells retrieved from the surface data source 120. Although the disclosures presented herein will be drawn towards an image presentable on an ND, they are not limited to an ND but may be employed on other display unit(s) that may employ shading techniques in the generation of pixel data representative of an image depicting terrain and/or a surface.

Referring now to FIG. 2, the use of shading effects is evident. Shading effects may be determined as a function of a shader algorithm(s) employing one or more factors such as, but not limited to, the type of light source, angle of light source to terrain of the terrain model, distance falloff, and advanced lighting techniques. For example, light sources could fall into one category including, but not limited to, directional light, point light, spotlight, and area light. The angle of the light source could vary with changes in terrain elevation or the rate of change of terrain, i.e., density of terrain contours. An increase or decrease in the elevation of terrain in the scene outside the aircraft might cause the angle of light source (assumed to be located behind the aircraft) to change with respect to the surface of the terrain. For example, an increase of terrain elevation could result with lighter shading and/or greater intensity of a greyscale color (s) being generated due to a decrease of the angle of the light source striking the surface of the terrain; likewise, a decrease of terrain elevation could result with darker shading and/or lesser intensity of a greyscale color(s) being generated because of an increase of the angle striking the surface of the terrain. Distance falloff is a technique where shading becomes darker as the distance from a light source becomes greater; the employment of such technique could produce a more realistic image. Advanced lighting techniques could include those which have been created to produce smooth shading including, but are not limited to, Gouraud shading and Phong shading techniques. Examples of an employment of shading effects may be found in U.S. Pat. No. 8,264,498 of VanDerKamp et al of entitled "System Apparatus, and Method for Presenting a Monochrome Image of Terrain on a Head-Up Display Unit" and U.S. Pat. No. 9,245,378 of Villagomez et al entitled "Surface Data Generating System Device, and Method," each of which is incorporated by reference herein in its entirety.

Some advantages and benefits of embodiments discussed herein are shown in FIGS. 2 through 3D by illustrating how shading function may be employed by the IG 130 to enhance images of the terrain or surface. As shown in FIG. 2, an image of three-dimensional terrain of flat surface and non-flat surfaces areas depicting multiple colors and shading is illustrated. The image includes areas of flat surfaces/terrain 202 and areas of non-flat surfaces 204. As shown, the areas of flat surfaces/terrain 202 may be represented by one greyscale color, the areas of non-flat surfaces/terrain 204-A may be represented by multiple greyscale colors, and the areas of non-flat surfaces 204-B may be represented by range-dependent colors other than greyscale colors.

In some embodiments, the IG 130 could have produce the image by applying a coloring function(s) and a shading function(s) known to those skilled in the art. Knowing the altitude of an aircraft, the IG 130 could apply coloring functions by identifying elevations represented in the surface data falling within one or more ranges configurable by a manufacturer and/or end-user. For the purpose of illustration and not of limitation, the first range 206 (indicated by the color red) could be those elevations, if any, identified as being equal to or greater than the aircraft altitude; the second range 208 (indicated by the color amber or yellow) could be those elevations, if any, identified as being 500 feet or less below the aircraft altitude; and the third range 210 (indicated by the color green) could be those elevations, if any, identified as being in between 500 feet and 1000 feet below the aircraft altitude. In some embodiments, the values of each range and/or the colors one or more ranges could be defined to correspond with required terrain clearances and/or alerting criteria specified in TSO-151c.

In some embodiments, the IG 130 could apply a shading function to all of the elevations represented in the surface data by one or more shading methods known to those skilled in the art as discussed above. One shading method may produce one or more multiple shades of grey; that is, the method may employ the use of a light source and one or more multiple colors of a greyscale (multiple greyscale colors).

Multiple greyscale colors may be produced from multiple color models. One color model could be a multiple-channel color model such as the RGB (red-green-blue) color model having an 8-bit color scale for each channel ranging from 0 to 255. When this color model is employed, the greyscale multiple colors are comprised of equal channel values. Expressed in triplets of 8-bits, the greyscale colors of black, white, and mid-grey are comprised of the following: (0, 0, 0); (255, 255, 255); and (127, 127, 127), respectively; expressed are percentages, these greyscale colors are comprised of the following triplets: (0%, 0%, 0%); (100%, 100%, 100%); and (50%, 50%, 50%), respectively. A second color model comprised of a single-channel color model may be employed, where the greyscale colors of black, white, and mid-grey are comprised of the following in an 8-bit color scale: (0), (255), and (127), respectively; expressed as percentages, these greyscale colors are comprised of the following: (0%), (100%), and (50%), respectively. Although the following discussion of multiple-channels will be drawn to the RGB color model, the embodiments herein are not limited to this color model only but include any color model employing any color scale.

For flat surfaces of terrain, a reference threshold color of mid-grey (50%, 50%, 50%) could be employed as indicated by the areas of flat surface/terrain 202 in FIG. 2. For the purpose of illustration and not of limitation, the disclosures presented will be drawn to a light source that forms a right angle to a flat surface/terrain, where a light source is perpendicular to a surface normal of the surface/terrain. Although the reference threshold color of mid-grey is discussed in FIG. 2, the embodiments disclosed herein not limited to this color.

For a non-flat surface of terrain generally facing towards the light source, the angle formed between its surface normal and the light source falls in between ninety and zero degrees. A range of greyscale colors in between the reference threshold color (50%, 50%, 50%) and white (100%, 100%, 100%) could be respectively employed (forming a scale from 50 to 100), where the former is indicative of the shallowest ascending terrain before the terrain flattens and the latter of the steepest ascending terrain facing the light source as indicated in the areas of non-flat surface/terrain 204-A in FIG. 2.

For a non-flat surface of terrain generally facing away from the light source, the angle formed between its surface normal and the light source falls in between one-hundred eighty and ninety degrees. A range of greyscale colors in between black (0%, 0%, 0%) and the reference threshold color (50%, 50%, 50%) could be respectively employed (forming a scale from 0 to 50), where the former is indicative of the shallowest descending terrain before the terrain flattens and the latter of the steepest terrain descending away from the light source as indicated in the areas of non-flat surface/terrain 204-A in FIG. 2. As indicted by the areas of non-flat surface/terrain 204-B, the one or more greyscale colors resulting from the shading method may be incorporated with the one or more colors resulting from the application of a coloring function to produce an image of terrain that is both shaded and colored.

For the purpose of illustration, it will be assumed that a first pixel (Pixel X) is found within the area of non-flat surface/terrain 204-A that faces away from the light source, and that the angle between its surface normal and the light source falls in between ninety and one-hundred eighty degrees for which a greyscale color of (23%, 23%, 23%) has been determined. Also, it will be assumed that a second pixel (Pixel Y) is found within the area of non-flat surface/terrain 204-A facing towards the light source, and that the angle between its surface normal and the light source falls in between zero and ninety degrees for which a greyscale color of (78%, 78%, 78%) has been determined. It should be noted that, on a scale from 50 to 100, the number 78 is 56% of 100 when beginning at 50. In addition, it will be assumed that a third pixel (Pixel Z) is found within the area of flat surface/terrain 202, and that a right angle has been formed between its surface normal and the light source from which a greyscale color of (50%, 50%, 50%) has been determined.

The advantages and benefits of the embodiments discussed herein may be illustrated in FIG. 3A through 3D by showing examples of how the depiction of terrain shading may be minimized while still providing the pilot with a visual effect of relief shading. In some embodiments, the IG 130 could be configured to modify a subset of pixels comprised of the pixels falling outside of the first range 206, the second range 208, and the third range 210. The reference threshold color in the shading computation could move towards zero, and a pixel intensity factor could be applied to the subset of pixels after the movement. Then, the IG 130 could generate pixel data representative of the greyscale colors of the subset of pixels, resulting in the modification.

For the purpose of illustration, assume that the reference threshold color has moved downward to black (0%, 0%, 0%) For a non-flat surface of terrain generally facing towards the light source of which an angle formed between its surface normal and the light source falls in between zero and ninety degrees, a range of greyscale colors in between the reference threshold color (0%, 0%, 0%) and white (100%, 100%, 100%) could be respectively employed (forming a scale from 0 to 100). For a non-flat surface of terrain generally facing away the light source of which an angle formed between its surface normal and the light source falls in between ninety and one-hundred eighty degrees, the reference threshold color black (0%, 0%, 0%) may be employed without a range of greyscale colors. For a flat surface of terrain of which a right angle is formed between its surface normal and the light source, the reference threshold color black (0%, 0%, 0%) may also be employed without a range of greyscale colors.

Because the angle of the light source and the surface normal of Pixel X falls in between ninety and one-hundred eighty degrees, the resultant greyscale color for Pixel X is black (0%, 0%, 0%) Because the angle of the light source and the surface normal of Pixel Z is a right angle, the resultant greyscale color for Pixel Z is black (0%, 0%, 0%) Because the angle of the light source and the surface normal of Pixel Y falls in between zero and ninety degrees, the resultant greyscale color for Pixel Y will fall in between white (100%, 100%, 100%) and the reference threshold color (0%, 0%, 0, 0%) Because Pixel Y was 56% of 100 on a scale from 50 to 100, the resultant greyscale color for Pixel Y on the scale from 0 to 100 is the greyscale color of (56%, 56%, 56%).

Referring now to FIG. 3A, a pixel intensity factor has been set to zero percent. After moving the reference threshold color to zero, the IG 130 could apply the pixel intensity factor by multiplying the pixels of the subset by the pixel intensity factor. Because the pixel intensity factor of FIG. 3A is zero percent, Pixel X remains black (0%, 0%, 0%) Pixel Y becomes black (0%, 0%, 0%) and Pixel Z remains black (0%, 0%, 0%) As shown in FIG. 3A, the pixel color of each pixel in the area of flat surface/terrain 202 and the area of non-flat surface/terrain 204-A is black.

Referring now to FIG. 3B, a pixel intensity factor has been set to thirty percent. Following the discussion from above, the greyscale colors of the subset of pixels could be determined by the IG 130 by moving the reference threshold color to zero, then multiplying by the pixel intensity factor; as such, Pixel X remains (0%, 0%, 0%), Pixel Y becomes darker (16.8%, 16.8%, 16.8%), and Pixel Z remains black (0%, 0%, 0%). As shown in FIG. 3B, the pixel color of each pixel in the area of flat surface/terrain 202 is black, but the pixel color of each pixel in the area of non-flat surface/terrain 204-A that was whiter than the reference threshold color prior to the modification (such as Pixel Y) is now a greyscale color other than black.

Referring now to FIG. 3C, a pixel intensity factor has been set to sixty percent. Following the discussion from above, the greyscale colors of the subset of pixels could be determined by the IG 130 by moving the reference threshold color towards zero, then multiplying by the pixel intensity factor. As such, Pixel X remains (0%, 0%, 0%), Pixel Y becomes (33.6%, 33.6%, 33.6%), and Pixel Z remains black (0%, 0%, 0%). As shown in FIG. 3C, the pixel color of each pixel in the area of flat surface/terrain 202 is black, but the pixel color of each pixel in the area of non-flat surface/ terrain 204-A that was whiter than the reference threshold color prior to the modification (such as Pixel Y) is now a greyscale color other than black. Because the pixel intensity factor is greater than the pixel intensity factor of FIG. 3B, the greyscale colors of the area of non-flat surface/terrain 204-A of FIG. 3C are whiter than those of FIG. 3B (which may be seen by comparing the "dot-densities" of FIGS. 3B and 3C that have been used to illustrate to differences between that greyscale colors of the terrain).

Referring now to FIG. 3D, a pixel intensity factor has been set to one-hundred percent. Following the discussion from above, the greyscale colors of the subset of pixels could be determined by the IG 130 by moving the reference threshold color toward zero, then multiplying by the pixel intensity factor. As such, Pixel X remains (0%, 0%, 0%) Pixel Y remains (56%, 56%, 56%) and Pixel Z remains black (0%, 0%, 0%). As shown in FIG. 3D, the pixel color of each pixel in the area of flat surface/terrain 202 is black, but the pixel color of each pixel in the area of non-flat surface/ terrain 204-A that was whiter than the reference threshold color prior to the modification (such as Pixel Y) is now a greyscale color other than black. Because the pixel intensity factor is more than that of FIG. 3C, the greyscale colors of the area of non-flat surface/terrain 204 of FIG. 3D are whiter than those of FIG. 3C (which may be seen by an absence of "dot-densities" compared to the presence of them in FIG. 3C).

Figure 4:
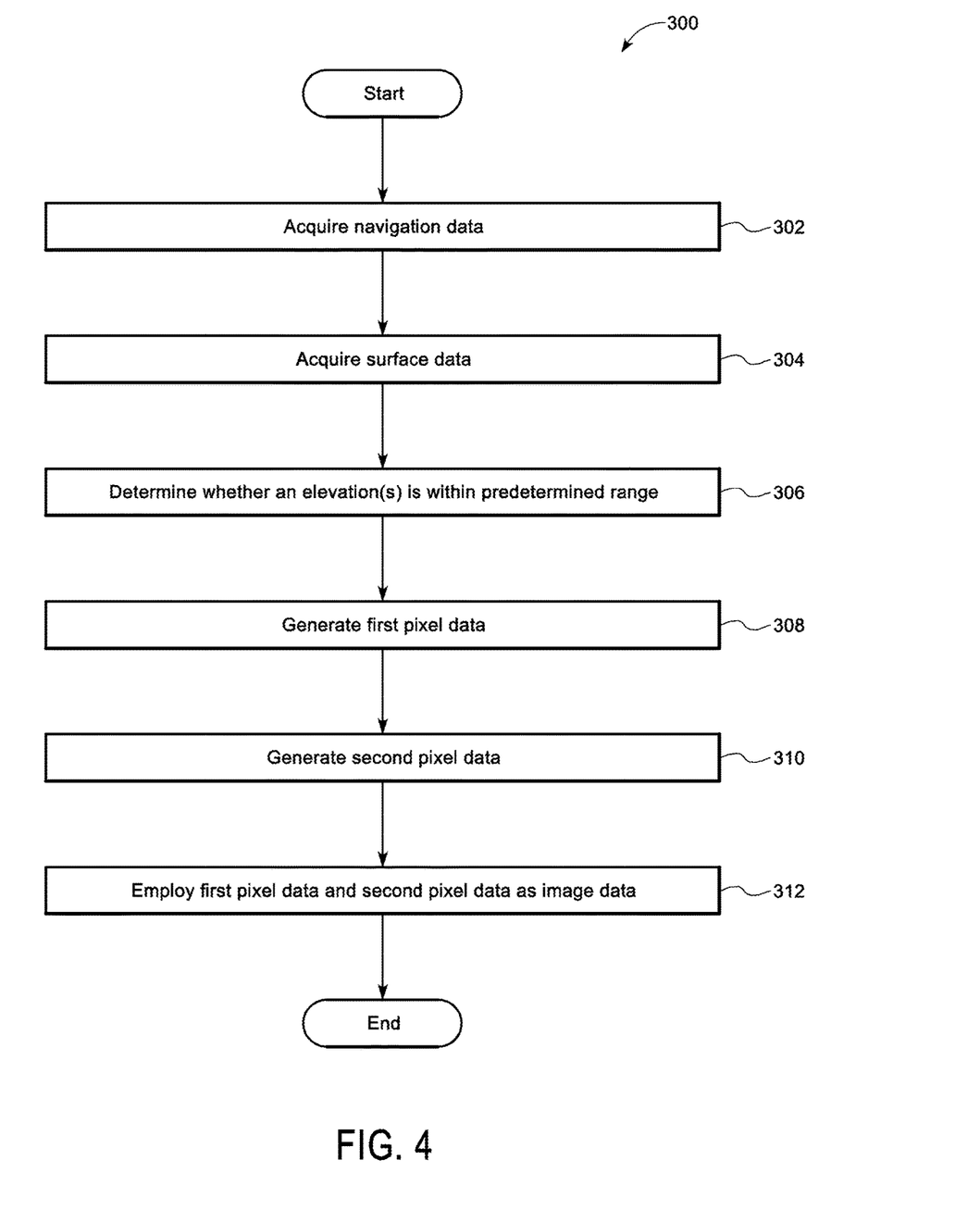
FIG. 4 depicts a flowchart illustrating an exemplary embodiment of a method for enhancing terrain relief shading according to the inventive concepts disclosed herein.

FIG. 4 depicts flowchart 300 disclosing an example of a method for enhancing relief shading of an image of terrain, where the IG 130 may be programmed or configured with instructions corresponding to the modules embodied in flowchart 300. In some embodiments, the IG 130 may be a processor or a combination of processors found in the display system 140 or any other system suitable for performing the task. Also, the IG 130 may be a processor of a module such as, but not limited to, a printed circuit card having one or more input interfaces to facilitate the two-way data communications of the IG 130, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the IG 130 receiving of navigation data, where the navigation data could be representative of at least geographic position and aircraft altitude. The flowchart continues with module 304 with the IG 130 acquiring of first surface data from the surface data source 120 based upon the navigation data. The first surface data could be comprised of a plurality of elevations (i.e., elevation values) of terrain and/or surface features located within the scene outside the aircraft.

The flowchart continues with module 306 with the IG 130 determining whether one or more elevations is within a predetermined or selectable elevation range to which one or more colors have been assigned, where the range may be predetermined prior to flight or selectable by the pilot during flight, where each range may be referenced to aircraft altitude. In some embodiments, there may be no surface data falling within one or more predetermined or selectable elevation ranges.

The flowchart continues with module 308 with the IG 130 generating first pixel data in response to the surface data being identified. When identified, the surface data could be subjected to at least a coloring function. In some embodiments, the surface data could be subjected to a shading function.

The flowchart continues with module 310 with the IG 130 generating second image data in response to the surface data not being identified. If not identified, the unidentified surface data could be subjected to at least a shading function.

The flowchart continues with module 312 with the IG 130 employing the first pixel data and the second pixel data as image data representative of an image of terrain of the plurality of elevations. The image data may include a plurality of colors or non-greyscale colors found in the first pixel data and a plurality of greyscale colors. Then, the method of flowchart 300 ends.

It should be noted that the steps of method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Furthermore, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for enhancing relief shading of an image of terrain, comprising:
    a presentation system comprised of at least one display unit configured to:
      receive image data provided by
        an image generator including at least one processor coupled to a non-transitory processor-readable medium storing processor-executable code for causing the at least one processor to:
          acquire navigation data;
          acquire surface data based upon the navigation data and representative of a plurality of elevations defining at least one of a plurality of surfaces;
          determine whether at least one of the plurality of elevations falls within an elevation range;
          generate at least one of first pixel data and second pixel data in response to the determination, where
            the first pixel data is representative of at least one non-greyscale color generated by applying a coloring function to a first portion of the surface data representative of the at least one of the plurality of elevations falling within the elevation range, and
            the second pixel data is representative of at least one greyscale-only color generated by applying a shading function to a second portion of the surface data representative of the at least one of the plurality of elevations not falling within the elevation range; and
          employ at least one of the first pixel data and the second pixel data as image data representative of an image of the at least one surface of a plurality of surfaces; and
      present the image represented in the image data on display unit other than a head-up display unit.

2. The system of claim 1, wherein
the navigation data is representative of at least aircraft altitude, and
the elevation range is determined as a function of the aircraft altitude.

3. The system of claim 1, wherein
the shading function is a first shading function, and
a second shading function is applied to the first portion of the surface data, such that
    a shading effect modifies the at least one non-greyscale color represented in the first pixel data.

4. The system of claim 1, wherein
the at least one of the plurality of surfaces defined by a plurality of elevations and represented in the second portion of surface data includes at least one of a flat surface, a first sloping surface, and a second sloping surface, where
the shading function applies
    a reference threshold color of mid-grey to at least one of a plurality of flat surfaces,
    a color darker than the reference threshold color to at least one of a plurality of first sloping surfaces, and
    a color lighter than the reference threshold color to at least one of a plurality of second sloping surfaces.

5. The system of claim 1, wherein
the at least one of the plurality of surfaces defined by a plurality of elevations and represented in the second portion of surface data includes at least one of a flat surface, a first sloping surface, and a second sloping surface, and
the shading function applies
    a reference threshold color of a color darker than mid-grey to at least one of a plurality of flat surfaces,
    the reference threshold color to at least one of a plurality of first sloping surfaces, and
    a color lighter than the reference threshold color to at least one of a plurality of second sloping surfaces.

6. The system of claim 5, wherein
the reference threshold color is black, whereby
    only the color black is presented for the at least one of the plurality of flat surfaces and the at least one of the plurality of first sloping surfaces.

7. The system of claim 1, wherein a pixel intensity function is applied to the second pixel data.

8. A device for enhancing relief shading of an image of terrain, comprising:
    an image generator including at least one processor coupled to a non-transitory processor-readable medium storing processor-executable code for causing the at least one processor to:

acquire navigation data;

acquire surface data based upon the navigation data and representative of a plurality of elevations defining at least one of a plurality of surfaces;

determine whether at least one of the plurality of elevations falls within an elevation range;

generate at least one of first pixel data and second pixel data in response to the determination, where the first pixel data is representative of at least one non-greyscale color generated by applying a coloring function to a first portion of the surface data representative of the at least one of the plurality of elevations falling within the elevation range, and the second pixel data is representative of at least one greyscale-only color generated by applying a shading function to a second portion of the surface data representative of the at least one of the plurality of elevations not falling within the elevation range; and employ at least one of the first pixel data and the second pixel data as image data representative of an image of the at least one surface of a plurality of surfaces, such that the image represented in the image data is presentable on a display unit other than a head-up display unit.

9. The device of claim 8, wherein
the navigation data is representative of at least aircraft altitude, and
the elevation range is determined as a function of the aircraft altitude.

10. The device of claim 8, wherein
the shading function is a first shading function, and
a second shading function is applied to the first portion of the surface data, such that
a shading effect modifies the at least one non-greyscale color represented in the first pixel data.

11. The device of claim 8, wherein
the at least one of the plurality of surfaces defined by a plurality of elevations and represented in the second portion of surface data includes at least one of a flat surface, a first sloping surface, and a second sloping surface, where
the shading function applies
a reference threshold color of mid-grey to at least one of a plurality of flat surfaces,
a color darker than the reference threshold color to at least one of a plurality of first sloping surfaces, and
a color lighter than the reference threshold color to at least one of a plurality of second sloping surfaces.

12. The device of claim 8, wherein
the at least one of the plurality of surfaces defined by a plurality of elevations and represented in the second portion of surface data includes at least one of a flat surface, a first sloping surface, and a second sloping surface, where
the shading function applies
a reference threshold color of a color darker than mid-grey to at least one of a plurality of flat surfaces,
the reference threshold color to at least one of a plurality of first sloping surfaces, and
a color lighter than the reference threshold color to at least one of a plurality of second sloping surfaces.

13. The device of claim 12, wherein
the reference threshold color is black, whereby only the color black is presented for the at least one of the plurality of flat surfaces and the at least one of the plurality of first sloping surfaces.

14. The device of claim 8, wherein a pixel intensity function is applied to the second pixel data.

15. A method for enhancing relief shading of an image of terrain, comprising:

acquiring, by an image generator including at least one processor coupled to a non-transitory processor-readable medium storing processor-executable code, navigation data from a navigation data source;

acquiring surface data from a surface data source based upon the navigation data and representative of a plurality of elevations defining at least one of a plurality of surfaces;

determine whether at least one of the plurality of elevations falls within an elevation range;

generating at least one of first pixel data and second pixel data in response to the determination, where the first pixel data is representative of at least one non-greyscale color generated by applying a coloring function to a first portion of the surface data representative of the at least one of the plurality of elevations falling within the elevation range, and;

the second pixel data is representative of at least one greyscale-only color generated by applying a shading function to a second portion of the surface data representative of the at least one of the plurality of elevations not falling within the elevation range; and employing at least one of the first pixel data and the second pixel data as image data representative of an image of the at least one surface of a plurality of surfaces, such that the image represented in the image data is presentable on a display unit other than a head-up display unit.

16. The method of claim 15, wherein
the shading function is a first shading function, and
a second shading function is applied to the first portion of the surface data, such that
a shading effect modifies the at least one non-greyscale color represented in the first pixel data.

17. The method of claim 15, wherein
the at least one of the plurality of surfaces defined by a plurality of elevations and represented in the second portion of surface data includes at least one of a flat surface, a first sloping surface, and a second sloping surface, where
the shading function applies
a reference threshold color of mid-grey to at least one of a plurality of flat surfaces,
a color darker than the reference threshold color to at least one of a plurality of first sloping surfaces, and
a color lighter than the reference threshold color to at least one of a plurality of second sloping surfaces.

18. The method of claim 15, wherein
the at least one of the plurality of surfaces defined by a plurality of elevations and represented in the second portion of surface data includes at least one of a flat surface, a first sloping surface, and a second sloping surface, where
the shading function applies
a reference threshold color of a color darker than mid-grey to at least one of a plurality of flat surfaces,
the reference threshold color to at least one of a plurality of first sloping surfaces, and a color lighter than the reference threshold color to at least one of a plurality of second sloping surfaces.

19. The method of claim 18, wherein
the reference threshold color is black, whereby
only the color black is presented for the at least one of the plurality of flat surfaces and the at least one of the plurality of first sloping surfaces.

20. The method of claim 15, wherein a pixel intensity function is applied to the second pixel data.

\* \* \* \* \*